United States Patent Office 3,307,973
Patented Mar. 7, 1967

---

3,307,973
DIALKYLSTANNOXY ORGANOMETALLIC COMPOUNDS AND CONDENSATION PRODUCTS
Ambrose J. Gibbons, Jr., Catonsville, Md., assignor to The Glidden Company, Cleveland, Ohio, a corporation of Ohio
No Drawing. Filed Jan. 17, 1964, Ser. No. 338,294
5 Claims. (Cl. 117—154)

This invention relates to novel organodimetallo compounds wherein one metal is tin and the other metal can be aluminum, silicon, boron, titanium, zirconium, or vanadium of trisubstituted vanadium oxide. The invention also relates to a novel condensation process for preparing said compounds.

The compounds of the invention can be used in a variety of ways; e.g. as water-repellants on substrates such as paper, cloth, wood, cement, metals, etc.; as fungicides, bacteriocides, insecticides, etc.; as stabilizers inhibiting heat- and/or light-activated decomposition of rigid and/or flexible polyolefins, polyvinylhalides and other resins; and as starting monomers for the preparation of homopolymers.

The compounds of the invention are believed to correspond to the general formula $$[R_2SnO-]_nE$$

Wherein R is an alkyl group of 1–8 carbons;
Wherein E is a radical selected from the group consisting of $MX_{v-n}$ and $M(R'_m)X_{v-n-m}$;
Wherein X of the above radicals is a monovalent radical selected from the group consisting of $-OR^0$ radicals and halogens;
Wherein $R^0$ is a monovalent radical selected from the group consisting of hydrocarbyl radicals and fluohydrocarbyl radicals of 1–18 carbon atoms;
Wherein R' is a monovalent hydrocarbyl radical of 1–12 carbon atoms;
Wherein M is selected from the group consisting of Al, Si, B, Ti, Zr and the trivalent vanadyl radical $\equiv VO$;
Wherein $v$ is the valency of M (i.e. 3 or 4);
Wherein $m$ is an integer between 1 and $v-1$ inclusive;
Wherein $n$ is an integer between 1 and $v$ inclusive;
And wherein $m+n$ is not greater than $v$.

Accordingly, it is an object of this invention to provide compounds corresponding to the general formula set forth above.

It is another object to provide a process for preparing said compounds, said process being characterized by the condensation of dialkyl tin oxide with $MX_v$ or $$M(R'_{m'})X_{v-m'}$$

compounds, wherein the alkyl group(s) of the tin oxide correspond to R of the above general formula, and wherein M, X, R' and $v$ are identical with M, X, R' and $v$, respectively, of the general formula, and wherein $m'$ is an integer between 1 and $v-1$.

These and related objects will be understood from the foregoing and following description of the invention.

I have discovered that dialkyl tin oxide can be condensed with $MX_v$ and $M(R'_{m'})X_{v-m'}$ compounds by simple heating; that is, no waste products result from said condensation. Thus the following equations apply where one starting material is of the $MX_v$ type and where $v$ is 4.

(I)      $R_2SnO + MX_4 \longrightarrow R_2SnONX_3$ 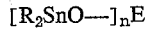

(II)     $2R_2SnO + MX_4 \longrightarrow [R_2SnO]_2MX_2$ 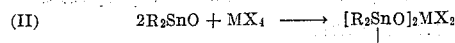

(III)    $3R_2SnO + MX_4 \longrightarrow [R_2SnO]_3MX$ 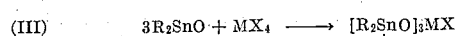

(IV)    $4R_2SnO + MX_4 \longrightarrow [R_2SnO]_4M$ 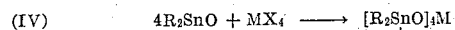

In like manner, up to three moles of $R_2SnO$ can be condensed with $MX_3$ where $v$ is 3.

Where one of the starting materials is of the $$M(R'_{m'})X_{v-m'}$$

type, and $v$ is 3, the following equations apply:

(V)     $R_2SnO + M(R')X_2 \longrightarrow R_2SnOM(R')X$ 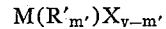

(VI)    $2R_2SnO + M(R')X_2 \longrightarrow \left[\begin{array}{c}R_2SnO\\|\\X\end{array}\right]_2 M(R')$ 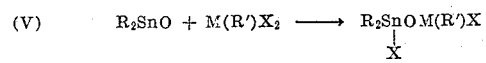  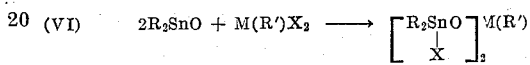 

In like manner, three moles of $R_2SnO$ can be condensed with a compound such as $MR'X_3$ (where $v$ is 4), whereas only one mole of $R_2SnO$ can be condensed with a compound such as $M(R'_3)X$.

The condensation reaction can be carried out by simply heating a dry mixture of the starting materials above about 125° C. or can be carried out equally well in the presence of anhydrous nonreactive hydrocarbon solvents having a refluxing temperature above about 110° C. Lower boiling solvents can also be used by carrying out the reaction under autogenous pressure or under inert gas pressure externally applied. The reaction takes place easily with $TiX_4$ compounds at temperatures between about 140° and 185° C.

A dry protective atmosphere should be used to secure best yields of the condensation products of the invention.

For various uses of the compounds of the invention, such as for treating substrates to render them water-repellant, the compounds can be dissolved in organic solvent(s) to secure solutions having any desired product concentration below saturation, preferably to a product concentration of say 2-15% by weight. For such and other end uses, the compounds can preferably be prepared by carrying out the condensation reaction in the presence of the desired solvent(s). Solution in hydrocarbon solvent(s) additionally serves to protect the product from undue hydrolysis.

The following examples illustrate the principles of the invention and include the best modes presently known to me for practicing the invention in accordance with said principles.

EXAMPLE 1

*Dibutylisopropoxystannoxytitanium triisopropoxide*

The following starting materials are used:

Dibutyltin oxide _____ g__12.5 (.05 mole)
Tetraisopropyl titanate _____ g__14.2 (.05 mole)
Toluene _____ml__ 300

The materials are charged to a flask, stirred and heated to reflux temperature for 3 hours. Solution takes place. The mass is then allowed to cool. The cool mass is polish filtered by suction to recover a clear filtrate. After stripping solvent from the filtrate, a clear yellowish liquid remains ($n_d^{24} \equiv 1.5022$). A few drops of the liquid on a watch glass develop a colorless skin or film when exposed to air. On stirring this film to expose fresh surfaces, a white solid forms. The resulting solid turns brown when heated to about 270° C. The brown solid is insoluble in hot toluene.

EXAMPLE 2

*Dibutylisopropoxystannoxytitanium triisopropoxide*

The materials used are:
Dibutyltin oxide _____ g__25.0 (0.1 mole)
Tetraisopropyl titanate _____ g__28.4 (0.1 mole)

The materials are heated in a flask and liquefaction takes place at 150–170° C. in 30 minutes. The liquid is brown. On cooling and standing a clear, beer-colored liquid remains. It contains no solid matter. The refractive index $n_d^{24}$ is 1.4995.
Calculated for $C_{20}H_{46}SnTiO_5$: Sn=22.2%; Ti=9%. Found: Sn=21.8%; Ti=9.1% (by weight).

EXAMPLE 3

*Bis(dibutylisopropoxystannoxy) titanium diisopropoxide*

The materials used are:
A. Dibutyltin oxide _____ g__37.2 (0.15 mole)
B. Tetraisopropyl titanate [1] _____g__21.3 (0.075 mole)

[1] Freshly distilled.

A is charged to a 100 ml. flask equipped with microdistillation assembly and a drying tube, and filled with a dry nitrogen atmosphere. Then B is added. The mass is heated and becomes a homogeneous liquid at about 160° C. Heating is continued at 160–185° C. for about two hours. On cooling the mass and allowing it to stand, a clear light yellow liquid remains; $n_d^{22}$=1.5050. A few drops of the liquid on a watch glass develop a film more slowly than the liquid of Example 2.

EXAMPLE 4

*Dibutylchlorostannoxytrimethylsilane*

The starting materials are:
A. Dibutyltin oxide _____g__37.2 (0.15 mole)
B. Trimethylchlorosilane _____ g__16.3 (0.15 mole)
C. Toluene _____ml__ 300

A and C are charged to a 1 liter 3-neck flask equipped with stirrer, thermometer and reflux condenser protected with a dry atmosphere. Then B is added and the mass is heated while being stirred. At 110° a clear solution exists with no indication of distillation of B at its boiling point of 58° C. The flask and contents are allowed to cool. The contents are a clear light yellow solution. On evaporating the toluene first at atmospheric conditions and then under vacuum, a clear light yellow liquid remains; $n_d^{23}$=1.4994; yield is 92.5%. The liquid does not fume in dry air but appears very sensitive to moisture. As the product contains silicon, tin, and chlorine, the reaction can be formulated as follows:

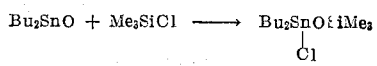

Verification of this reaction is obtained by isolating the known compound $(Bu_2SnCl)_2O$ on product hydrolysis.

EXAMPLE 5

*Dioctylisopropoxystannoxytitanium triisopropoxide*

Starting materials are:

A. Dioctyltin oxide _____ g__36.1 (0.1 mole)
B. Tetraisopropyl titanate _____g__38.4 (0.1 mole)
C. Toluene _____ml__ 500

A and C are charged to a flask equipped with stirrer, thermometer and Dean Stark reflux tube, and A is rendered anhydrous by azeotroping off the water. B is added and the mass is heated, stirred and refluxed for two hours. Reaction takes place, rapidly giving a clear yellow solution. After cooling to room temperature, the solution is polish filtered and 645 ml. toluene is added to the filtrate to bring the product concentration to about 10% by weight.

EXAMPLE 6

*Dibutyl-2-ethylhexoxystannoxytitanium tri-2-ethylhexoxide*

Starting materials are:

A. Dibutyltin oxide _____ g__24.8 (0.1 mole)
B. Tetrakis(2-ethylhexyl)titanate [1] g.__56.5 (0.1 mole)
C. Toluene _____ml__ 300

[1] Freshly distilled.

The materials are worked up in the manner described in Example 5, thereby producing a solution having a product having a product concentration of about 10%.

EXAMPLE 7

*Condensation of dibutyltin oxide with tri-isopropyl borate*

The materials used are:
Dibutyltin oxide _____moles__ 0.1
Tri-isopropylborate _____do____ 0.1
Toluene _____ml__ 450

The materials are heated together in a flask as previously described until a clear solution is secured. On cooling and standing, 6.9 grams of a white solid separates. The solid has a melting point of 300–315° C. The clear filtrate, when applied to filter paper, imparts water-repellency to the latter. On evaporation of the solvent from the filtrate, a white waxy solid weighing 18.2 grams is secured; it is soluble in petroleum ether and toluene.

EXAMPLE 8

*Dibutylisopropoxystannoxyzirconium triisopropoxide*

The materials used are:

A. Dibutyltin oxide _____g__ 24.8 (0.1 mole)
B. Tetraisopropylzirconate _____g__ 32.7 (0.1 mole)
C. Toluene _____ml__ 500

A and B are combined with dry C, stirred, heated, and refluxed. As refluxing continues a light brown clear solution forms and the dibutyltinoxide disappears. The remaining mass is cooled, then diluted with toluene to 575 ml. thereby to prepare a solution having a solids content of 10%.

EXAMPLE 9

*Dioctylisopropoxystannoxyaluminum di-isopropoxide*

The materials are:

A. Dioctyltin oxide _____g__ 36.1 (0.1 mole)
B. Aluminum tri-isopropoxide ___g__ 20.4 (0.1 mole)
C. Toluene _____ml__ 500

A, B, and C are charged to a flask and heated to reflux with stirring. As the refluxing continues the dioctyltin oxide gradually disappears and a clear light tan solution is formed. When no solid matter remains, some of the toluene is distilled off until the refractive index of the distillate is that of toluene. The remaining mass in the flask is cooled and then diluted to 565 ml. with toluene, thereby to secure a solution having a solids content of 10%. This solution, when applied to paper and dried, imparts water-repellency to the paper.

EXAMPLE 10

*Dioctylbutoxystannoxyvanadium dibutoxyoxide*

The materials used are:

A. Dioctyltin oxide _____ g__ 36.1 (0.1 mole)
B. Tri-n-butoxyvanadate _____ g__ 28.6 (0.1 mole)
   $[(C_4H_9O)_3V=O]$
C. Toluene _____ ml__ 66.4

A, B (added as a 50% solution in Philips Soltrol 130 [1])

[1] Isoparaffinic hydrocarbon, boiling range 313.5° F. (min.) to 360° F. (max.). Flash point 125° F.

are charged to a flask and heated to reflux with stirring under a protective atmosphere. As refluxing continues, the dioctyltin oxide gradually disappears and a tannish-green solution appears. When all dioctyltin oxide has been consumed, the batch is allowed to cool. Then it is diluted with toluene to 647 ml. to provide a solution having 10% solids.

EXAMPLE 11

*Dibutylethoxystannoxyvinyldiethoxysilane*

The materials used are:

A. Dibutyltin oxide _____ g__ 24.9 (0.1 mole)
B. Vinyltriethoxysilane _____ g__ 19.0 (0.1 mole)
C. Toluene _____ ml__ 500

Charge A, B and C to a flask, and heat to reflux with stirring. Solution of the dibutyltin oxide occurs gradually leaving a nearly colorless solution. When all dibutyltin oxide has been consumed, cool the mass and then dilute a portion with toluene to 2% solids for use in testing on paper. The remainder was concentrated by distillation to leave circa 26 g. of clear, slightly yellow liquid; $n_d^{26}=1.4825$.

EXAMPLE 12

The products obtained by reacting dibutyltin oxide with tetraisopropyl titanate by the method of Example 1 using mole ratios of 1:1 to 4:1 are tested for fungicidal activity by the Agar Plate test against five species of fungi.

TABLE I

| Example | Compound | Con'n in Toluene, Percent | Zone Inhibition (mm.) | | | | |
|---|---|---|---|---|---|---|---|
| | | | A | B | C | D | E |
| 12A | $Bu_2(C_3H_7O)SnOTi(OC_3H_7)_3$ | 10 | 0 | 5 | 2 | 1 | 7 |
| | | 1 | 0 | 5 | Tr | Tr | 5 |
| | | 0.1 | 0 | 5 | 0 | 0 | 3 |
| 12B | $[Bu_2(C_3H_7O)SnO]_2Ti(OC_3H_7)_2$ | 7.8 | 0 | 3 | Tr | 0 | 3 |
| | | 1 | 0 | 2 | 0 | 0 | 3 |
| | | 0.1 | 0 | 2 | 0 | 0 | 3 |
| 12C | $[Bu_2(C_3H_7O)SnO]_3TiOC_3H_7$ | 6.9 | 2 | 6 | 3 | 1 | 7 |
| | | 1 | 0 | 5 | 1 | Tr | 5 |
| | | 0.1 | 0 | 3 | 0 | 0 | 2 |
| 12D | $[Bu_2(C_3H_7O)SnO]_4Ti$ | 10 | 3 | 6 | 3 | 2 | 6 |
| | | 1 | 0 | 6 | 2 | 1 | 6 |
| | | 0.1 | 0 | 3 | 0 | Tr | 3 |

A, Botrytis allis; B, Penicillium italicum; C, Aspergillus niger; D, Rhizopus nigricans; E, Glomerella cingulata.

Table II below shows the favorable water-repellency attributes of the four above compounds and other compounds of the invention, when measured by recognized water-repellency tests on treated paper. All solutions contain 2% of the indicated compound in toluene by weight.

TABLE II

| Example | Compound | Pickup [1] | Fotosize [2] Penetration (in seconds) | | | Cobb [3] Test Gm./M. |
|---|---|---|---|---|---|---|
| | | | Water | .03N NaOH | Feathering Ink [5] | |
| 12A | Above | 0.59 | >1,800 | | 158 | |
| 12B | ___do___ | 0.64 | >1,800 | | 173 | |
| 12C | ___do___ | 0.59 | >1,800 | | 128 | |
| 12D | ___do___ | 0.54 | >1,800 | | 114 | |
| 5 | $Bu_2(BuO)SnOTi(OBu)_3$ | 0.46 | >1,800 | >1,800 | 129 | 25.2 |
| 5 | $Oct_2(PrO)SnOTi(OPr)_3$ | 0.47 | >1,800 | >1,800 | 200 | 22.8 |
| 6 | $Bu_2(EHO)SnOTi(OEH)_3$ [4] | 0.49 | >1,800 | >1,800 | 7 | 30.0 |
| 8 | $Bu_2(PrO)SnOZr(OPr)_3$ | 0.50 | >1,800 | >1,800 | 367 | 24.0 |
| 9 | $Oct_2(PrO)SnOAl(OPr)_2$ | 0.47 | >1,800 | >1,800 | 59 | 26.2 |
| 10 | $Oct_2(BuO)SnOVO(OBu)_2$ | 0.46 | >1,800 | >1,800 | 109 | 27.0 |
| 11 | $Bu_2(EtO)SnOSi(CH=CH_2)(OEt)_2$ | 0.49 | >1,800 | >1,800 | 6 | 31.2 |

[1] Dry weight pickup in pounds per 3000 square feet.
[2] Water Fotosize Test:
Special handsheets containing 75% hardwood pulp and 25% softwood pulp are prepared in the Paper Laboratory. A 3½" x 7" sheet of this paper is dipped into the water repellent solution, removed and rolled free of excess solvent with a hard rubber roller on a glass surface. The handsheets are then air dried and conditioned at 73° F. and 50% relative humidity for one day.
The treated paper is placed under the surface of a reservoir of water in the Twing-Albert Fotosize Penetration Tester and the number of seconds required to effect wetting or penetration is recorded. This time is automatically recorded by a timer shut-off actuated by minimum light transmittance through the paper. Feathering ink, aqueous base, or aqueous acid can be substituted for the plain water.
[3] TAPPI Standards and Suggested Methods; T-441 M-60; (Technical Association of the Pulp and Paper Industry). A five minute exposure test is used, and the weight of water absorbed per square meter of paper is reported. Paper can be 0.0004 mil and over in thickness.
[4] OEH and EHO represent 2-ethylhexoxide.
[5] Feathering ink is prepared by combining: 6 grams blue dye (National 2 BEX); 250 ml. water at 120° F.; 6 ml. hydrochloric acid. Cool to 70° F. and dilute to a total volume of 950 ml.

EXAMPLE 13

This example illustrates the use of various dibutylstannoxy condensates as urethane foam cataylsts.

To prepare the foams 200 grams of polyether* is weighed into a paper drinking cup. Silicone oil (dimethyl polysiloxane) in the amount of 3.0 grams, and 0.6–1.0 gram of catalysts are added and mixed with the resin for two minutes with a high speed 3-blade propeller mixer.

Diethylene triamine (0.2 g.) and N-ethylmorpholine (0.30 g.) are dissolved in 7.4 g. water in a small beaker. This solution is added to the above mixture and stirred into it by mixing for one minute.

Toluene diisocyanate (96.4 g.) is rapidly combined with the above mixture and poured into a suitable container.

The stopwatch is started at the time of pouring, and the elapsed time (in seconds) required for the foam to attain maximum height is recorded as "rise time." A control catalyst, e.g. stannous octoate, gives a rise time of 50–90 seconds.

The following table summarizes the results of various tests carried out in the foregoing manner with the indicated compounds as catalysts:

| Example | Compound | Amount Used (ml.) | Rise Time (seconds) | Color of foam | Catalyst Rating |
|---|---|---|---|---|---|
| 11 | $Bu_2(OBu)SnOTi(OBu)_3$ | 0.8 | 60 | 1 yellow | Good. |
| 11 | $Bu_2(EtO)SnOSi(CH=CH_2)(OEt)_2$ | 0.8 | 45 | White | Very good. |
| 11 | $Bu_2(EtO)SnOSi(CH=CH_2)(OEt)_2$ | 0.5 | 40 | do | Do. |
| 6 | $Bu_2(EHO)SnOTi(OEH)_3$ | 0.8 | 55 | 1 yellow | Do. |

Having described my invention, what I claim is:

1. An organometallic compound according to the formula $$[R_2SnO-]_nE$$

wherein R is an alkyl group of 1–8 carbons;
wherein E is a radical selected from the group consisting of $MX_{v-n}$ and $M(R'_m)X_{v-n-m}$;
wherein X of the above radicals is a halogen;
wherein R' is a monovalent hydrocarbyl radical of 1–12 carbon atoms;
wherein M is selected from the group consisting of Al, Si, B, Ti, Zr and the trivalent vanadyl radical=VO;
wherein $v$ is a valency of M (i.e. 3 or 4);
wherein $m$ is an integer between 1 and $v-1$ inclusive;
wherein $n$ is an integer between 1 and $v$ inclusive; and
wherein $m+n$ is not greater than $v$.

2. An organometallic compound according to claim 1 wherein X is chlorine.

3. The process for making polyurethane foam comprising contacting polyether, toluene diisocyanate and water as a foaming agent in the presence of a catalytic amount of an organometallic compound according to the formula $$[R_2SnO-]_nE$$

---
*Niaz Triol LG–56; glycol polyether having an average molecular weight of about 3,000, an average hydroxyl number (mg. KOH/gram) of 56.

wherein R is an alkyl group of 1–8 carbons;
wherein E is a radical selected from the group consisting of $MX_{v-n}$ and $M(R'_m)X_{v-n-m}$;
wherein X of the above radicals is a monovalent radical selected from the group consisting of $-OR^0$ radicals and halogen;
wherein $R^0$ is a monovalent radical selected from the group consisting of hydrocarbyl radicals and fluohydrocarbyl radicals of 1–18 carbon atoms;
wherein R' is a monovalent hydrocarbyl radical of 1–12 carbon atoms;
wherein M is selected from the group consisting of Al, Si, B, Ti, Zr and the trivalent vanadyl radical=VO;
wherein $v$ is the valency of M (i.e. 3 or 4);
wherein $m$ is an integer between 1 and $v-1$ inclusive;
wherein $n$ is an integer between 1 and $v$ inclusive;
and wherein $m+n$ is not greater than $v$.

4. The method of rendering cellulosic webs water-repellent comprising contacting said cellulosic web with a solution of an organometallic compound according to the formula $$[R_2SnO-]_nE$$

wherein R is an alkyl group of 1–8 carbons;
wherein E is a radical selected from the group consisting of $MX_{v-n}$ and $M(R'_m)X_{v-n-m}$;
wherein X of the above radicals is a monovalent radical selected from the group consisting of $-OR^0$ radicals and halogens;
wherein $R^0$ is a monovalent radical selected from the group consisting of hydrocarbyl radicals and fluohydrocarbyl radicals of 1–8 carbon atoms;
wherein R' is a monovalent hydrocarbyl radical of 1–12 carbon atoms;
wherein M is selected from the group consisting of Al, Si, B, Ti, Zr and the trivalent vanadyl radical=VO;
wherein $v$ is the valency of M (i.e. 3 or 4);
wherein $m$ is an integer between 1 and $v-1$ inclusive;
wherein $n$ is an integer between 1 and $v$ inclusive;
and wherein $m+n$ is not greater than $v$.

5. The method according to claim 4 wherein said cellulosic web is paper.

References Cited by the Examiner
UNITED STATES PATENTS 2,597,920  5/1952  Carroll _____ 260—429.5 X
2,867,641  1/1959  Ramsden _____ 260—429.7

TOBIAS E. LEVOW, *Primary Examiner.*

H. M. S. SNEED, *Assistant Examiner.*